United States Patent
Yoon et al.

(10) Patent No.: US 10,872,728 B2
(45) Date of Patent: Dec. 22, 2020

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Sun Ho Yoon, Suwon-si (KR); Jeong Ryeol Kim, Suwon-si (KR); Seong Han Park, Suwon-si (KR); Kyoung Ki Min, Suwon-si (KR); Young Kyu Park, Suwon-si (KR); Jong Han Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 38 days.

(21) Appl. No.: 16/161,398

(22) Filed: Oct. 16, 2018

(65) Prior Publication Data
US 2019/0362896 A1 Nov. 28, 2019

(30) Foreign Application Priority Data
May 28, 2018 (KR) .......................... 10-2018-0060430

(51) Int. Cl.
*H01G 4/30* (2006.01)
*H01G 4/008* (2006.01)
*H01G 4/12* (2006.01)

(52) U.S. Cl.
CPC .............. *H01G 4/30* (2013.01); *H01G 4/008* (2013.01); *H01G 4/1227* (2013.01)

(58) Field of Classification Search
CPC ........ H01G 4/30; H01G 4/012; H01G 4/1227; H01G 4/2325; H01G 4/008
See application file for complete search history.

(56) References Cited

U.S. PATENT DOCUMENTS

| 6,776,861 B2 | 8/2004 | Wang et al. |
| 9,236,185 B1 * | 1/2016 | Oguni ...................... H01G 4/30 |
| | (Continued) | |

FOREIGN PATENT DOCUMENTS

| JP | 2002-164248 A | 6/2002 |
| JP | 2006-024539 A | 1/2006 |
| | (Continued) | |

OTHER PUBLICATIONS

Korean Office Action dated Jun. 19, 2019 issued in Korean Patent Application No. 10-2018-0060430 (with English translation).

*Primary Examiner* — Michael P McFadden
(74) *Attorney, Agent, or Firm* — Morgan, Lewis & Bockius LLP

(57) ABSTRACT

A multilayer ceramic electronic component includes a ceramic body including a dielectric layer and first and second internal electrodes which face each other with the dielectric layer interposed therebetween. The first and second internal electrodes include a conductive metal and an additive. In a cross-section of the ceramic body in the length-thickness (L-T) plane, a ratio of content of the additive in the first and second internal electrodes in upper and lower portions of the ceramic body to a content of the additive in the first and second internal electrodes in a central portion of the ceramic body is around 0.63 to around 1.03.

16 Claims, 4 Drawing Sheets

(56) References Cited

U.S. PATENT DOCUMENTS

| | | |
|---|---|---|
| 2004/0175569 A1 | 9/2004 | Uchida |
| 2013/0321977 A1 | 12/2013 | Lee et al. |
| 2015/0027764 A1* | 1/2015 | Lee .................. H01G 4/30 |
| | | 174/260 |

FOREIGN PATENT DOCUMENTS

| | | |
|---|---|---|
| JP | 2007-158267 A | 6/2007 |
| KR | 10-2004-0078535 A | 9/2004 |
| KR | 2013-0136247 A | 12/2013 |
| KR | 2017-0077542 A | 7/2017 |

* cited by examiner

MULTILAYER CERAMIC ELECTRONIC COMPONENT AND METHOD OF MANUFACTURING THE SAME

CROSS-REFERENCE TO RELATED APPLICATION

This application claims priority under 35 U.S.C. § 119 to Korean Patent Application No. 10-2018-0060430 filed on May 28, 2018, in the Korean Intellectual Property Office (KIPO), the disclosure of which is incorporated herein by reference in its entirety.

BACKGROUND

1. Field

The present disclosure relates to a multilayer ceramic electronic component and a method of manufacturing the same, and more particularly, to a multilayer ceramic electronic component having improved reliability and a method of manufacturing the same.

2. Description of Related Art

Generally, electronic components using ceramic materials, such as a capacitor, an inductor, a piezoelectric element, a varistor, a thermistor, and the like, include a ceramic body formed of a ceramic material, an internal electrode formed in a ceramic body, and an external electrode mounted on the surface of the ceramic body and connected to the internal electrode.

A multilayer ceramic capacitor includes a plurality of layered dielectric layers, internal electrodes facing each other with one dielectric layer interposed therebetween, and external electrodes electrically connected to the internal electrodes.

A multilayer ceramic capacitor is widely used as a component of mobile communication devices such as computers, PDAs, cellular phones, and the like, as a multilayer ceramic capacitor is small-sized, secures high capacitance, and easily mounted.

With advancement in technology, there is a demand for miniaturization, high efficiency, and high capacitance of electronic components as electric and electronic devices are increasingly becoming more efficient, thinner, and smaller in size. Particularly, as high-speed CPUs have been developed, and electronic devices have been small-sized, digitalized, and highly efficient, a large amount of research and development has been conducted to implement miniaturized and thinned multilayer ceramic capacitors with high capacitance and low impedance in high frequencies.

A multilayer ceramic capacitor may be manufactured by layering a conductive paste for an internal electrode and a ceramic green sheet by a sheet method, a printing method, or the like, and being sintered simultaneously.

However, to forma dielectric layer, a ceramic green sheet is sintered in temperature higher than 1100° C., and a conductive paste may be sintered and shrunk at lower temperatures.

Accordingly, internal electrodes may be shrunk beyond a desired size while a ceramic green sheet is sintered, and internal electrodes may agglomerate with each other or break (become discontinuous), and connectivity of internal electrodes may degrade.

In the case in which internal electrodes agglomerate or break, reliability of the multilayer ceramic capacitor is decreased, and when connectivity of internal electrodes degrades, a capacitance of the multilayer ceramic capacitor is substantially reduced.

SUMMARY

An aspect of the present disclosure provides a multilayer ceramic electronic component having improved reliability, and a method of manufacturing the same.

According to an aspect of the present disclosure, a multilayer ceramic electronic component includes a ceramic body including a dielectric layer and first and second internal electrodes which face each other with the dielectric layer interposed therebetween. The first and second internal electrodes include a conductive metal and an additive. In a cross-section taken in a length-thickness (L-T) plane of the ceramic body, a ratio of a content of the additive in first and second internal electrodes in upper and lower portions of the ceramic body to a content of the additive in first and second internal electrodes in a central portion is around 0.63 to around 1.03.

According to another aspect of the present disclosure, a method of manufacturing a multilayer ceramic electronic component includes forming a ceramic green sheet, forming, on the ceramic green sheet, an internal electrode pattern using a conductive paste, the conductive paste including a conductive metal, an additive, and sulfur (S) of 500 ppm or less, forming a ceramic laminate by layering a plurality of ceramic green sheets, each including the internal electrode pattern, and forming a ceramic body including a plurality of dielectric layers and a plurality of internal electrodes by sintering the ceramic laminate. In a cross-section taken in a length-thickness plane of the ceramic body, a ratio of a content of an additive in first and second internal electrodes in upper and lower portions of the ceramic body to a content of an additive in the first and second internal electrodes disposed in a central portion is around 0.63 to around 1.03.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
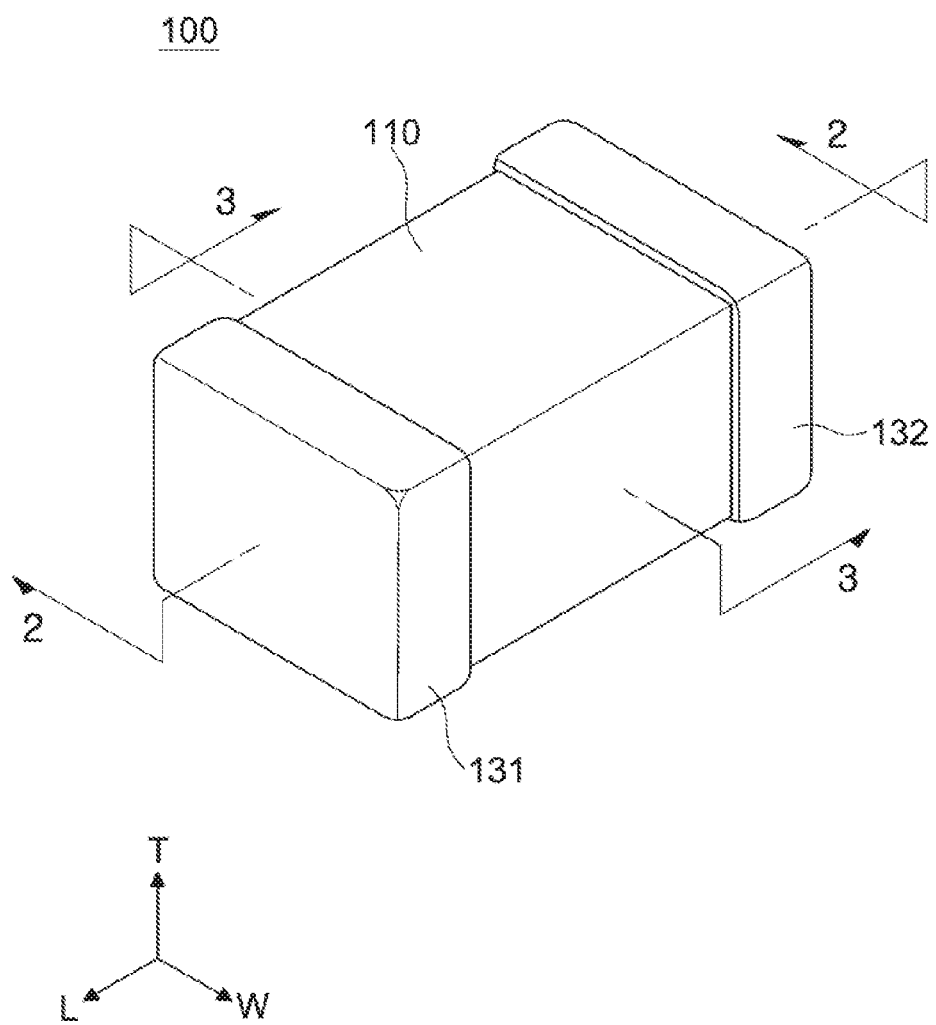
FIG. 1 is a perspective view of a schematic multilayer ceramic capacitor according to an example embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

Multilayer Ceramic Electronic Component

An aspect of the present disclosure relates to a multilayer ceramic electronic component. Electronic components using a ceramic material may be a capacitor, an inductor, a piezoelectric element, a varistor, a thermistor, and the like. In the below description, a multilayer ceramic capacitor will be described as an example of a multilayer ceramic electronic component.

FIG. 1 is a perspective view of a multilayer ceramic capacitor, according to an example embodiment.

Figure 2:
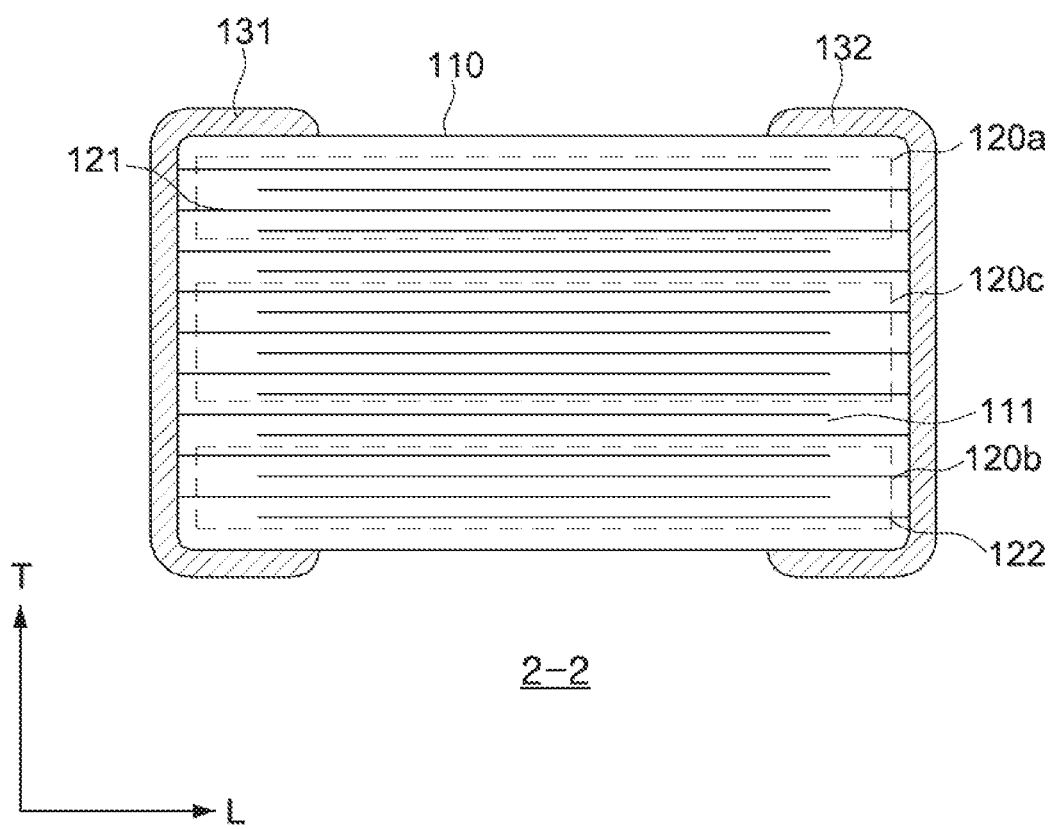
FIG. 2 is a cross-sectional view taken along line 2-2 in FIG. 1.

FIG. 2 is a cross-sectional view taken along line 2-2 in FIG. 1.

Figure 3:
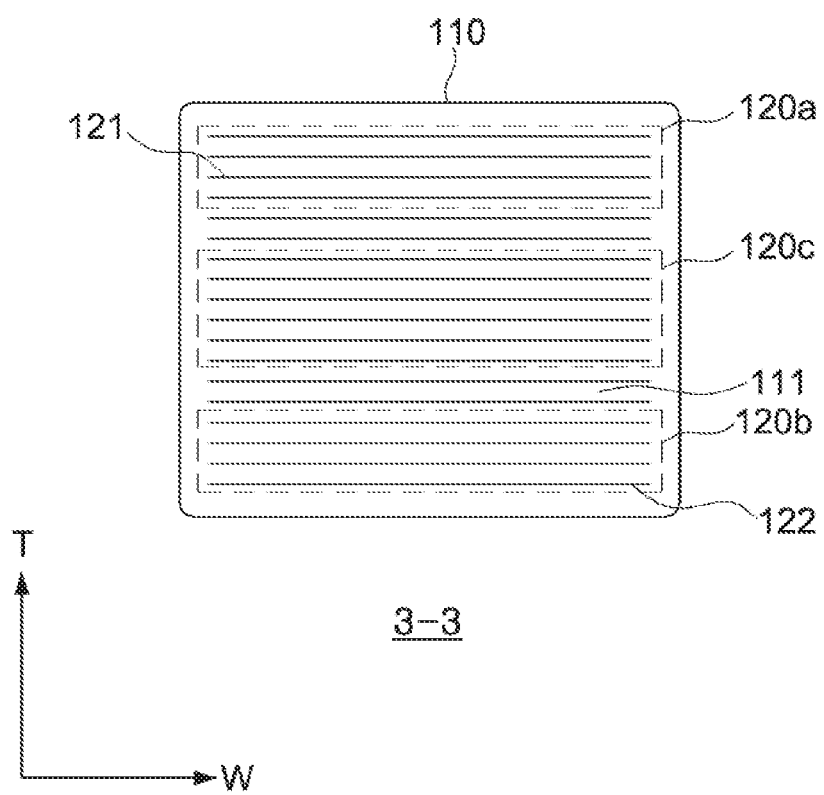
FIG. 3 is a cross-sectional view taken along line 3-3 in FIG. 1.

FIG. 3 is a cross-sectional view taken along line 3-3 in FIG. 1.

Referring to FIGS. 1, 2, and 3, a multilayer ceramic capacitor 100 may include a ceramic body 110 including a dielectric layer 111, a plurality of first and second internal electrodes 121 and 122 formed in the ceramic body 110 and facing each other with the dielectric layer 111 interposed therebetween, and first and second external electrodes 131 and 132 formed on an external surface of the ceramic body 110.

In the exemplary embodiment, in FIG. 1, a length direction of the multilayer ceramic capacitor may be defined as an L direction, a width direction may be defined as a W direction, and a thickness direction may be defined as a T direction. The thickness direction may be regarded as the same as a layering direction in which the dielectric layers are layered.

Although FIG. 1 illustrates the ceramic body 110 having an hexahedral shape, the shape is not limited in this regard. In other embodiments, the ceramic body 110, may have any desired shape, for instance, may not be limited to any particular shape.

The ceramic body 110 may be formed by layering a plurality of dielectric layers 111.

The plurality of dielectric layers 111 forming the ceramic body 110 may be in a sintered state, and adjacent dielectric layers may be integrated, such that adjacent dielectric layers may merge with each other and boundaries between adjacent dielectric layers may be indistinct.

The dielectric layers 111 may be formed by sintering a ceramic green sheet including a ceramic powder.

A type of ceramic powder is not limited to any particular ceramic powder and any ceramic powder known in the art may be used.

For example, ceramic powder may include a BaTiO3 ceramic powder, but the present disclosure is not limited thereto.

In other examples, the ceramic powder may be or include (Ba1-xCax)TiO3, Ba(Ti1-yCay)O3, (Ba1-xCax)(Ti1-yZry)O3, or Ba(Ti1-yZry)O3, which are formed by applying Ca, Zr, and the like, to BaTiO3, but the present disclosure is not limited thereto.

Also, the ceramic green sheet may include a transition metal, a rare earth element, magnesium (Mg), aluminum (Al), a combination thereof, and the like, in addition to the ceramic powder.

A thickness of the dielectric layer 111 may be varied in accordance with a capacitance design of the multilayer ceramic capacitor.

For example, a thickness of the dielectric layer 111 formed between two adjacent internal electrodes after being sintered may be 0.6 μm or less, but is not limited thereto.

The first and second internal electrodes 121 and 122 may be formed in the ceramic body 110.

The first and second internal electrodes 121 and 122 may be formed on the ceramic green sheet and layered, and may be formed in the ceramic body 110 with the dielectric layer 111 interposed therebetween by being sintered.

The first and second internal electrodes 121 and 122 may be provided as pairs of electrodes having different polarities, and may face each other in a layering direction (e.g., in the T direction in FIG. 2) of the dielectric layer.

As illustrated in FIG. 2, ends of the first and second internal electrodes 121 and 122 may be alternately exposed to a surface of a length (L) direction of the ceramic body 110.

Also, although it is not illustrated, the first and second internal electrodes 121 and 122 may have a lead, and may be exposed to a same surface of the ceramic body through the lead.

Also, the first and second internal electrodes 121 and 122 may have a lead and may be exposed to one or more surface of the ceramic body through the lead.

The first and second external electrodes 131 and 132 may be formed on an external surface of the ceramic body 110. For instance and as illustrated, the first and second external electrodes 131 and 132 may be formed on the ends of the ceramic body 110 in the length (L) direction. The first and second external electrodes 131 and 132 may be electrically connected to the first and second internal electrodes 121 and 122, respectively.

Specifically, the first external electrode 131 is electrically connected to the first internal electrode 121 exposed to a surface of the ceramic body 110, and the second external electrode 132 is electrically connected to the second internal electrode 122 exposed to the opposite surface of the ceramic body 110.

Although not illustrated, a plurality of external electrodes may be formed on the corresponding ends of the ceramic body 110 and connected to the corresponding first and second internal electrodes exposed on the surface at the corresponding ends of the ceramic body.

The first and second external electrodes 131 and 132 may be formed using a conductive paste including a metal powder.

A type of a metal powder included in the conductive paste may not be limited to any particular metal powder. For example, nickel (Ni), copper (Cu), or alloys thereof may be used.

A thickness of the first and second external electrodes 131 and 132 may be determined depending on intended usage, and the like. For example, the thickness may be 10 to 50 μm.

The first and second internal electrodes 121 and 122 may include a conductive metal and an additive to prevent contraction of the internal electrodes during the sintering process.

Figure 4:
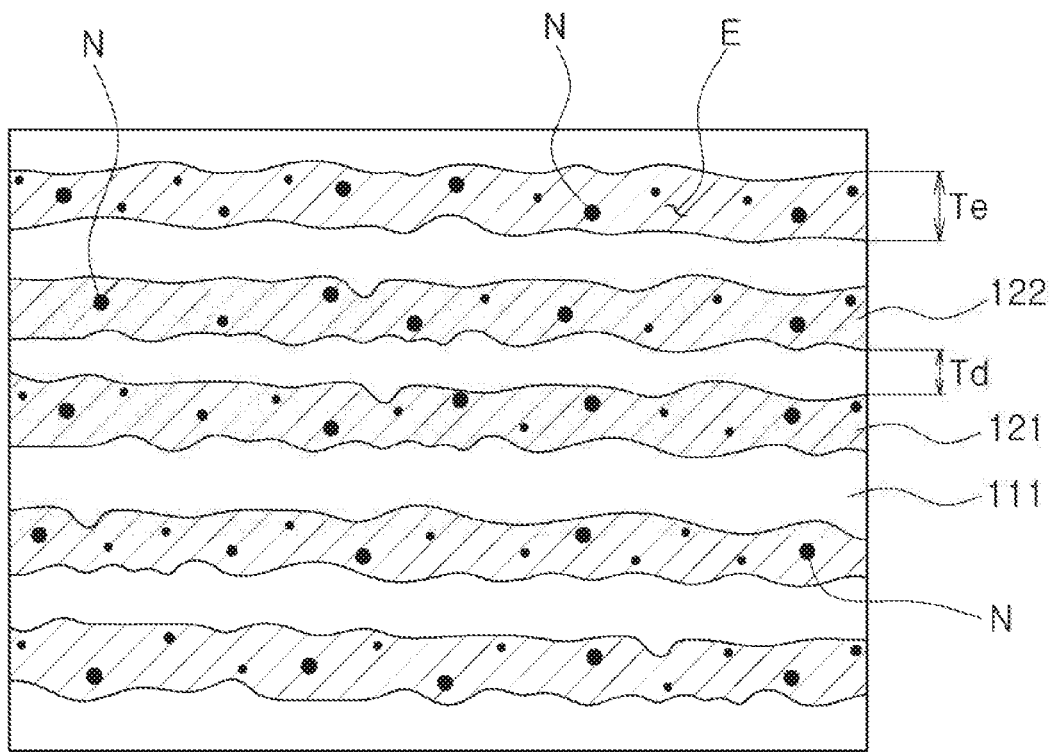
FIG. 4 is an enlarged view of a dielectric layer and an internal electrode of a multilayer ceramic capacitor according to an example embodiment.

FIG. 4 is an enlarged view of a dielectric layer 111 and an internal electrode 121 (122) of the multilayer ceramic capacitor 100, according to an example embodiment.

Referring to FIG. 4, the first and second internal electrodes 121 and 122 of the multilayer ceramic capacitor may include portions referred to as non-electrode portions (N), according to an exemplary embodiment. Portion of the first and second internal electrodes 121 and 122 except for the non-electrode portions (N) may be referred to an electrode portion (E), according to an exemplary embodiment.

According to an exemplary embodiment, the non-electrode portion (N) may be formed during the process of sintering of the first and second internal electrodes 121 and 122, and may be formed by a composition of the conductive paste forming the internal electrode.

The non-electrode portion (N) may include a ceramic additive. However, embodiments are not limited in this regard.

Referring to FIG. 4, the first and second internal electrodes 121 and 122 may include a conductive metal and an additive, and may include the electrode portion (E) including the conductive metal, and the non-electrode portion (N) including the additive. The non-electrode portion (N) may not contribute to a capacitance (or alternatively capacitive effect) of the multilayer ceramic capacitor 100.

A type of the conductive metal forming the first and second internal electrodes 121 and 122 may not be limited to any particular conductive metal. For example, a base metal may be used.

The conductive metal may include one or more of nickel (Ni), manganese (Mn), chromium (Cr), cobalt (Co), aluminum (Al), or alloys thereof. However, embodiments are not limited in this regard.

The additive may be the same material as that of the ceramic powder forming the dielectric layer 111. For example, a barium titanate (BaTiO3) powder may be used, but the present disclosure is not limited thereto.

As another example, the additive may be or include barium titanate (BaTiO3), ZrO2, Al2O3, TiN, SiN, AlN, TiC, SiC, WC, and the like, but the present disclosure is not limited thereto.

By adjusting a content of the additive included in the first and second internal electrodes 121 and 122, strength of the internal electrodes 121 and 122 may increase by controlling the non-electrode portion (N) in the first and second internal electrodes 121 and 122, and cracks may be limited by reducing a sintering contraction stress.

Specifically, in a cross-section of a length-thickness (L-T) direction (e.g., the view in FIG. 2) of the ceramic body 110, a ratio of a content of an additive in the first and second internal electrodes 121 and 122 (120a and 120b) disposed in upper and lower portions of the ceramic body 110 to a content of an additive in the first and second internal electrodes 121 and 122 (120c) disposed in a central portion of the ceramic body 110 may be around 0.63 to around 1.03.

To prevent contraction (or shrinkage) of internal electrodes, the prior art uses the method of adding a ceramic additive to a conductive paste of an internal electrode, or adding sulfur (S) to a surface of a conductive metal to change properties of nickel (Ni) when used in the internal electrodes.

When adding a ceramic additive to a conductive paste of an internal electrode to limit contraction of an internal electrode, a small amount of the additive is trapped in an internal electrode, and a fraction difference of an additive in each location of an internal electrode disposed in a body is high. Accordingly, it may be difficult to implement a small-sized multilayer ceramic capacitor with high capacitance.

Also, when adding sulfur (S) to a surface of a conductive metal to change properties of nickel (Ni), a small amount of an additive may be retained in an internal electrode compared to the amount of sulfur (S) added. Further, the trapped additive is not evenly dispersed. Accordingly, it may be difficult to implement a small-sized multilayer ceramic capacitor with high capacitance.

However, according to an exemplary embodiment, in the cross-section of a length-thickness (L-T) direction of the ceramic body 110, as a ratio of a content of an additive in the first and second internal electrodes 121 and 122 disposed in upper and lower portions of the ceramic body 110 to a content of an additive in the first and second internal electrodes 121 and 122 disposed in a central portion is around 0.63 to around 1.03, agglomeration (or collection) and breaking (discontinuation) of electrodes may be minimized. As a result, a multilayer ceramic capacitor with improved reliability and higher capacitance may be implemented.

In the description below, the method of configuring a ratio of a content of an additive in the first and second internal electrodes 121 and 122 disposed in upper and lower portions of the ceramic body 110 to a content of an additive in the first and second internal electrodes 121 and 122 disposed in a central portion to be around 0.63 to around 1.03 will be described.

To obtain the aforementioned content ratio, sulfur (S) may be added to a conductive paste of an internal electrode, and the sulfur (S) content may be 500 ppm or less, unlike in the prior art.

If the conductive paste for an internal electrode is nickel (Ni), microparticles of 180 nm or less may be included, and the additive may also include microparticle powder of 30 nm or less.

As the conductive paste for an internal electrode includes 500 ppm or less of sulfur (S) content, and includes 180 nm or less of nickel (Ni) content and 30 nm or less of an additive content, shrinkage (for instance, anisotropic shrinkage) of an internal electrode may be minimized and, additionally, during sintering process, the additive may be dispersed relatively evenly in the first and second internal electrodes 121 and 122.

Thus, according to the exemplary embodiment, a ratio of content of an additive in the first and second internal electrodes 121 and 122 disposed in upper and lower portions of the ceramic body 110 to a content of an additive in the first and second internal electrodes 121 and 122 disposed in a central portion of the ceramic body 110 may be around 0.63 to around 1.03.

Generally, additives may agglomerate with one another during a heat treatment process, and the additives may be squeezed out (or released) when internal electrodes are sintered and these may be adsorbed into a dielectric layer. Accordingly, a thickness of a dielectric layer may be increased, and it may be difficult to reduce the size of a multilayer ceramic electronic component.

According to an exemplary embodiment, as the conductive paste of an internal electrode includes a low content of sulfur (S) of 500 ppm or less, temperature of reduction initiation of nickel (Ni) may decrease, and accordingly, the additive may be trapped in an internal electrode before the additive agglomerates.

Because the additive may be trapped in an internal electrode in a relatively lower temperature, there may be a reduced likelihood of the additive being squeezed out (or released) into a dielectric layer.

Accordingly, variation of dispersion of the additive in each location of an internal electrode in the body may be minimized as the additive may be trapped before a difference in a particle growth of the additive occurs in each location, caused by temperature variation.

Also, by using a microparticle additive, there may be a low likelihood of the additive being squeezed out (or released) into a dielectric layer, and accordingly, a multilayer ceramic electronic component in which an additive is evenly dispersed in an internal electrode may be obtained.

By satisfying the above-described conditions, a multilayer ceramic electronic component with higher capacitance and increased reliability may be obtained.

Also, as thermal stability of an internal electrode may relatively increase based on the above-described conditions, a thickness (T) of a dielectric layer may be further reduced compared to the reduction in width (W) and length (L) directions when being sintered, and a thickness of the dielectric layer may thus be reduced. Consequently, capacitance may be increased.

If a ratio of content of the additive in the first and second internal electrodes 121 and 122 disposed in upper and lower portions of the ceramic body 110 to a content of the additive in the first and second internal electrodes 121 and 122 disposed in a central portion is less than around 0.63, the content of sulfur (S) included in the paste of an internal electrode may exceed 500 ppm, and, as a result, reliability may be reduced due to a decrease in capacitance, an increase in cracks, and the like.

If a content ratio of the additive in the first and second internal electrodes 121 and 122 disposed in upper and lower portions of the ceramic body 110 to a content of the additive in the first and second internal electrodes 121 and 122 disposed in a central portion exceeds 1.03, the content of sulfur (S) included in the paste of an internal electrode may be too low to effectively prevent contraction of an internal electrode, and accordingly, there may be a problem in reliability, such as mismatching between an internal electrode and a dielectric layer, cracks, and the like.

A content ratio of an additive trapped in the first and second internal electrodes 121 and 122 to a content of a conductive metal may be around 1.0% or higher, and more preferably, a content ratio of an additive trapped in the first and second internal electrodes 121 and 122 to a content of a conductive metal may be around 1.0% to around 3.0%.

As the content ratio of an additive trapped (or otherwise retained) in the first and second internal electrodes 121 and 122 to a conductive metal is around 1.0% to around 3.0%, a multilayer ceramic electronic component with high capacitance and high reliability may be obtained.

If the content ratio of an additive trapped (or retained) in the first and second internal electrodes 121 and 122 is less than about 1.0%, reliability may decrease since cracks may increase during sintering.

If the content ratio of an additive trapped (or retained) in the first and second internal electrodes 121 and 122 exceeds about 3.0%, the content of the additive may increase, and this may cause a decrease in capacitance due to an increase of a non-electrode portion (N).

Referring back to FIGS. 2 and 3, the first and second internal electrodes 120C disposed in a central portion of the ceramic body 110 may occupy an area of about 40% to about 60% of the entirety of the area occupied by all the first and second internal electrodes 121 and 122.

For the purposes of discussion herein, the first and second internal electrodes 120C disposed in a central portion of the ceramic body 110 may collectively refer to internal electrodes 121 and 122 positioned generally in the central region of the ceramic body 110 with reference to a layering direction (e.g., a thickness (T) direction) of the first and second internal electrodes 121 and 122.

The first and second internal electrodes 120A and 120B disposed in upper and lower portions (with reference to the thickness (T) direction) of the ceramic body 110 may each occupy 10% of the entirety of the area occupied by the first and second internal electrodes 121 and 122 from an uppermost internal electrode (121/122) to a lowermost internal electrode (121/122).

The first and second internal electrodes 120A and 120B disposed on upper and lower portions of the ceramic body 110 may include internal electrodes disposed at or adjacent the outermost portions of the ceramic body 110 in a thickness (T) direction of the first and second internal electrodes 121 and 122. The first and second internal electrodes 120A and 120B occupy an area that is around 10% or less of the area occupied by all the first and second internal electrodes 121 and 122. In an example, the area occupied by all the first and second internal electrodes 121 and 122 is measured from the topmost internal electrode to the bottommost internal electrode, as viewed in the thickness (T) direction.

Whether a ratio of content of an additive in the first and second internal electrodes 121 and 122 disposed in upper and lower portions of the ceramic body 110 to a content of an additive in the first and second internal electrodes 121 and 122 disposed in a central portion is about 0.63 to about 1.03 may be determined by measuring an area of a non-electrode portion including the additive.

Referring to FIG. 4, a thickness (Td) of the dielectric layer 111 may be 0.6 μm or less.

A thickness (Te) of the first and second internal electrodes 121 and 122 may be according to intended usage. For example, the thickness may be about 0.7 μm or less, about 0.1 to about 0.5 μm, or about 0.3 to about 0.5 μm.

The thickness (Te) of the first and second internal electrodes 121 and 122 may refer to an average thickness of the first and second internal electrodes 121 and 122 disposed between the dielectric layers 111.

The average thickness of the first and second internal electrodes 121 and 122 may be measured by scanning a cross-section taken in a length-thickness (L-T) plane of the ceramic body 110 by a scanning electron microscope (SEM).

For example, the average value may be obtained by measuring a thickness of a desired internal electrode extracted from an image obtained by scanning a cross-section of a length-thickness (L-T) plane using a scanning electron microscope (SEM) in thirty points with a constant interval in a width direction.

The thirty points with a constant interval may be measured at a capacitance forming portion, an area of overlap between the first and second internal electrodes 121 and 122.

Also, in the case in which the average value is measured in 10 or more internal electrodes in addition to the above, the average thickness of an internal electrode may be further generalized.

Method of Manufacturing a Multilayer Ceramic Capacitor

According to another exemplary embodiment, a method of manufacturing a multilayer ceramic electronic component may include forming a ceramic green sheet, forming an internal electrode pattern using a conductive paste including a conductive metal, an additive, and a sulfur (S) content of about 500 ppm or less, forming a ceramic laminate by layering ceramic green sheets in which the internal electrode pattern is formed, and forming a ceramic body including a dielectric layer and an internal electrode by sintering the ceramic laminate. In a cross-section taken in a length-thickness plane of the ceramic body, a content ratio of an additive in first and second internal electrodes disposed in upper and lower portions of the ceramic body to a content of an additive in first and second internal electrodes disposed in a central portion is around 0.63 to around 1.03 among the first and second internal electrodes.

According to another exemplary embodiment, the method of manufacturing a multilayer ceramic capacitor may further include forming an internal electrode pattern using a conductive paste including a conductive metal, an additive, and sulfur (S) content of about 500 ppm or less.

To change properties of nickel (Ni), sulfur (S) may be added to a surface of a conductive metal, but, unlike in the prior art, sulfur (S) of 500 ppm or less may be included in the conductive paste.

According to another exemplary embodiment, as the conductive paste for an internal electrode includes 500 ppm or less of sulfur (S), temperature of contraction initiation of nickel (Ni) may decrease, and accordingly, the additive may be trapped (or otherwise retained) in an internal electrode before the additive agglomerates.

According to example embodiments described above, as a conductive paste for an internal electrode includes a low content of sulfur (S), the additive may be trapped (or retained) in an internal electrode at a lower temperature, and accordingly, there may be a reduced likelihood of the additive being released into a dielectric layer.

Thus, variations of dispersion of the additive in each location of an internal electrode in the body may be reduced as the additive is retained before a difference in a particle growth of the additive occurs in each location, caused by temperature variations.

Also, as a microparticle additive is used, the possibility of an additive being released into a dielectric layer may reduce, and accordingly, a multilayer ceramic electronic component with an evenly dispersed additive in an internal electrode may be obtained.

By satisfying the above-described conditions, a multilayer ceramic electronic component with higher capacitance and higher reliability may be implemented.

With regard to the method of manufacturing a multilayer ceramic capacitor in the present disclosure, a general method of manufacturing a multilayer ceramic capacitor may be used to elements other than the specific portions described above. The detailed description thereof is therefore omitted for the sake of brevity.

Example Embodiment

Table 1 below shows a content of sulfur (S) in a conductive paste, all average fractions of an inhibitor trapped in an internal electrode, and whether cracking due to contraction occurs and whether a target capacitance is obtained with a ratio of content of an additive of internal electrodes in upper and lower portions to a content of an additive of internal electrodes in a central portion of a multilayer ceramic capacitor.

The multilayer ceramic capacitor was manufactured by undergoing the steps as below.

A dielectric layer was manufactured by using a plurality of ceramic green sheets, which are formed by coating a carrier film with a slurry including a powder such as barium titanate (BaTiO3) having an average particle size of about 0.05 to about 0.2 μm, and then drying.

Then, a conductive paste for an internal electrode including nickel particles, a ceramic additive and sulfur (S) was formed in accordance with ratios in Table 1.

An internal electrode was formed by coating the green sheet with the conductive paste for an internal electrode by a screen printing process, and a laminate was formed by layering the green sheets in 200 to 300 layers.

A chip of "0603" size was manufactured by cutting and compressing, and the chip was sintered in temperature in the range of about 1050° C. to about 1200° C. in a reductive atmosphere having about 0.1% or less of $H_2$.

A multilayer ceramic capacitor was manufactured through processes including a process of forming an external electrode, a process of plating, and the like, and electrical properties was evaluated. In the case in which capacitance degraded by 10% or more when capacitance of the designed chip was measured (for example, in the case in which a capacitance value is 4.23 μF or less with a target capacitance of 4.7 μF), it was determined that a desired capacitance was not obtained.

A presence of a crack around a boundary portion between a margin portion in which an internal electrode is not printed and a capacitance forming portion in which an internal electrode is printed (as seen in a cross-section of a width and thickness (W-T) plane) was observed using an optical microscope.

In experimental data in Table 1, a ratio of thicknesses between an internal electrode and a dielectric layer was 1:1.

TABLE 1

| Sample | Sulfur content (ppm) | Fraction of trapped additive (%) | Content ratio of additive of internal electrode in upper and lower portions to content of additive of internal electrode in central portion (%) | Valid capacitance to target capacitance (%) | Sintering crack (ea) | Reliability evaluation |
|---|---|---|---|---|---|---|
| 1* | 2000 | 0.1-0.9 | 0-30 | 83 | 10/100 | x |
| 2* | 1000 | 0.3-0.8 | 10-50 | 87 | 13/100 | x |
| 3 | 500 | 1.0-1.2 | 63-78 | 115 | 2/100 | ○ |
| 4 | 200 | 1.5-2.2 | 85-101 | 111 | 1/100 | ○ |
| 5 | 100 | 1.8-3.0 | 90-103 | 123 | 1/100 | ○ |

*: Comparative example,
○: Good,
x: Defect

Referring to Table 1, in samples 1 and 2, the comparative examples, a ratio of content of an additive in the first and second internal electrodes 121 and 122 disposed in upper and lower portions to a content of an additive in the first and second internal electrodes 121 and 122 disposed in a central portion was about 0.63 or less among the first and second internal electrodes 121 and 122, and a content of sulfur (S) included in the paste for an internal electrode exceeded 500 ppm. In this case, reliability of the capacitor may be reduced due to reduced capacitance, an increase of cracks during sintering, and the like.

If a ratio of content of an additive in the first and second internal electrodes 121 and 122 disposed in upper and lower portions to a content of an additive of the first and second internal electrodes 121 and 122 disposed in a central portion exceeded 1.03 among the first and second internal electrodes 121 and 122, although not indicated in Table 1, contraction (shrinkage) of an internal electrode was not effectively prevented as the content of sulfur (S) included in the paste of an internal electrode was too low, and as a result, reliability may be poor due to mismatching between an internal electrode and a dielectric layer, cracking, and the like.

In samples 3, 4, and 5, which are prepared according to example embodiments disclosed herein, as the measurement range suggested in the present disclosure was satisfied, a desired capacitance was obtained and cracking was not observed after the sintering process. Accordingly, a multilayer ceramic capacitor with improved reliability and higher capacitance may be obtained.

According to an aspect of the present disclosure, by adjusting a ratio of a content of an additive in internal electrodes disposed in upper and lower portions of a body to a content of an additive in internal electrodes disposed in a central portion of the body to be around 0.63 to around 1.03 among internal electrodes, a multilayer ceramic electronic component with higher capacitance and higher reliability may be obtained.

While the exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
    a ceramic body including a dielectric layer and first and second internal electrodes which face each other with the dielectric layer interposed therebetween, the first and second internal electrodes including a conductive metal and an additive,
    wherein, in a cross-section of the ceramic body in the length-thickness plane, an amount of the additive in the first and second internal electrodes in upper and lower portions of the ceramic body is different than an amount of the additive in the first and second internal electrodes in a central portion of the ceramic body.

2. The multilayer ceramic electronic component of claim 1, wherein a ratio of a content of the additive in the first and second internal electrodes to a content of the conductive metal is 0.5% or higher.

3. The multilayer ceramic electronic component of claim 2, wherein the ratio of the content of the additive in the first and second internal electrodes to the content of the conductive metal is around 0.5% to around 3.0%.

4. The multilayer ceramic electronic component of claim 1, wherein the first and second internal electrodes disposed in the central portion of the ceramic body occupy an area around 40% to 60% of area occupied by all the first and second internal electrodes in the ceramic body.

5. The multilayer ceramic electronic component of claim 1, wherein the first and second internal electrodes disposed in the upper and lower portions of the ceramic body occupy an area around 10% or less than an area occupied by all the first and second internal electrodes from an uppermost internal electrode to a lowermost internal electrode.

6. The multilayer ceramic electronic component of claim 1, wherein a thickness Te of each of the first and second internal electrodes satisfies the equation $0.1\ \mu m \leq Te \leq 0.5\ \mu m$.

7. The multilayer ceramic electronic component of claim 1, wherein the additive comprises a ceramic material.

8. The multilayer ceramic electronic component of claim 1, wherein, in the cross-section of the ceramic body in the length-thickness plane, a ratio of a content of the additive in the first and second internal electrodes in the upper and lower portions of the ceramic body to a content of the additive in the first and second internal electrodes in the central portion of the ceramic body is around 0.63 to around 1.03.

9. A method of manufacturing a multilayer ceramic electronic component, comprising:
    forming a ceramic green sheet;
    forming, on the ceramic green sheet, an internal electrode pattern using a conductive paste, the conductive paste including a conductive metal, an additive, and sulfur (S) of 500 ppm or less;
    forming a ceramic laminate by layering a plurality of ceramic green sheets, each including the internal electrode pattern; and
    forming a ceramic body including a plurality of dielectric layers and a plurality of internal electrodes by sintering the ceramic laminate,
    wherein, in a cross-section of the ceramic body taken in a length-thickness plane, an amount of the additive in internal electrodes of the plurality of internal electrodes in upper and lower portions of the ceramic body is different than an amount of the additive in internal electrodes in a central portion of the ceramic body.

10. The method of claim 9, wherein a ratio of a content of the additive in the internal electrodes to a content of the conductive metal is around 0.5% or higher.

11. The method of claim 10, wherein the ratio of the content of the additive in the internal electrodes to the content of the conductive metal is around 0.5% to around 3.0%.

12. The method of claim 9, wherein the internal electrodes in the central portion of the ceramic body occupies an area of around 40% to around 60% of the entire area occupied by the plurality of internal electrodes.

13. The method of claim 9, wherein the internal electrodes in the upper and lower portions of the ceramic body occupy an area of around 10% or less of the entire area occupied by the plurality of internal electrodes from an uppermost internal electrode to a lowermost internal electrode.

14. The method of claim 9, wherein a thickness Te of each of the internal electrodes satisfies the equation $0.1\ \mu m \leq Te \leq 0.5\ \mu m$.

15. The method of claim 9, wherein the additive comprises a ceramic material.

16. The method of claim 9, wherein, in the cross-section of the ceramic body taken in the length-thickness plane, a ratio of a content of the additive in the internal electrodes of the plurality of internal electrodes in the upper and lower portions of the ceramic body to a content of the additive in the internal electrodes in the central portion of the ceramic body is around 0.63 to around 1.03.

* * * * *